United States Patent
Marin et al.

(10) Patent No.: US 7,637,109 B2
(45) Date of Patent: Dec. 29, 2009

(54) POWER GENERATION SYSTEM INCLUDING A GAS GENERATOR COMBINED WITH A LIQUIFIED NATURAL GAS SUPPLY

(75) Inventors: Ovidiu Marin, Saint Cloud (FR); Ravikiran Sangras, Oak Park, IL (US); Keith Pronske, Rancho Cardova, CA (US)

(73) Assignees: American Air Liquide, Inc., Fremont, CA (US); Clean Energy Systems, Inc., Cordova, CA (US)

( * ) Notice: Subject to any disclaimer, the term of this patent is extended or adjusted under 35 U.S.C. 154(b) by 498 days.

(21) Appl. No.: 11/171,499

(22) Filed: Jul. 1, 2005

(65) Prior Publication Data

US 2006/0032228 A1    Feb. 16, 2006

Related U.S. Application Data

(60) Provisional application No. 60/598,094, filed on Aug. 2, 2004.

(51) Int. Cl.
*F02C 6/18*    (2006.01)
*F02C 3/30*    (2006.01)

(52) U.S. Cl. .......................................... 60/780; 60/775

(58) Field of Classification Search .............. 60/39.465, 60/39.52, 39.12, 772, 780, 775, 39.182
See application file for complete search history.

(56) References Cited

U.S. PATENT DOCUMENTS 3,183,677 A    5/1965    Hashemi-Tafreshi
3,508,090 A    4/1970    Crampton et al.
5,295,350 A  *  3/1994    Child et al. .................... 60/780
5,457,951 A  *  10/1995    Johnson et al. ................ 60/780

(Continued)

FOREIGN PATENT DOCUMENTS

JP    54079998    1/1981

(Continued)

OTHER PUBLICATIONS

Nakaiwa, M., et al.: "Evaluation of an Energy Supply System with Air Separation", Energy Conversion and Management, Elsevier Sciencve Publishers, Oxford, GB, vol. 37, No. 3, Mar. 1996, pp. 295-301, XP004039816, ISSN 0196-8904, pp. 295, paragraph 1, p. 297, paragraph 2.

(Continued)

*Primary Examiner*—Michael Cuff
*Assistant Examiner*—Gerald L Sung
(74) *Attorney, Agent, or Firm*—Christopher J. Cronin

(57) ABSTRACT

A power generation system includes a gas generator configured to receive an oxygen stream and a gaseous hydrocarbon fuel stream at an inlet of the gas generator, and a turbine section disposed downstream from the gas generator to receive and expand a combustion product stream from the gas generator. A heat exchange section is provided to facilitate heat exchange between a liquefied natural gas (LNG) supply from a LNG supply source and at least one other stream flowing within the system such that at least a portion of the LNG stream is converted to the gaseous hydrocarbon fuel stream that is to be delivered to the gas generator and the at least one other stream is cooled to a selected temperature.

2 Claims, 3 Drawing Sheets

U.S. PATENT DOCUMENTS

| | | | |
|---|---|---|---|
| 5,680,764 A | 10/1997 | Viteri | |
| 5,709,077 A | 1/1998 | Beichel | |
| 5,715,673 A | 2/1998 | Beichel | |
| 5,724,805 A * | 3/1998 | Golomb et al. | 60/783 |
| 5,956,937 A | 9/1999 | Beichel | |
| 5,970,702 A | 10/1999 | Beichel | |
| 6,170,264 B1 | 1/2001 | Viteri et al. | |
| 6,206,684 B1 | 3/2001 | Mueggenburg | |
| 6,247,316 B1 | 6/2001 | Viteri | |
| 6,389,814 B2 | 5/2002 | Viteri et al. | |
| 6,393,867 B1 * | 5/2002 | Guillard | 62/648 |
| 6,523,349 B2 | 2/2003 | Viteri | |
| 6,598,398 B2 | 7/2003 | Viteri et al. | |
| 6,622,470 B2 | 9/2003 | Viteri et al. | |
| 6,637,183 B2 | 10/2003 | Viteri et al. | |
| 6,745,573 B2 | 6/2004 | Marin et al. | |
| 2002/0166323 A1 | 11/2002 | Marin et al. | |
| 2002/0174659 A1 | 11/2002 | Viteri et al. | |
| 2003/0131582 A1 | 7/2003 | Anderson et al. | |
| 2003/0233830 A1 | 12/2003 | Marin et al. | |
| 2004/0003592 A1 | 1/2004 | Viteri et al. | |
| 2004/0016237 A1 | 1/2004 | Marin et al. | |
| 2004/0065088 A1 | 4/2004 | Viteri et al. | |
| 2004/0134197 A1 | 7/2004 | Marin et al. | |

FOREIGN PATENT DOCUMENTS

| | | | |
|---|---|---|---|
| JP | 11313328 | * | 5/2001 |
| WO | WO 03069132 | | 8/2003 |

OTHER PUBLICATIONS

PCT International Search Report dated Oct. 19, 2005.

* cited by examiner

000
POWER GENERATION SYSTEM INCLUDING A GAS GENERATOR COMBINED WITH A LIQUIFIED NATURAL GAS SUPPLY

CROSS-REFERENCE TO RELATED APPLICATION

This application claims priority from U.S. Provisional Patent Application Ser. No. 60/598,094, entitled "Use of Liquified Natural Gas with a Gas Generator", and filed Aug. 2, 2004. The disclosure of this provisional patent application is incorporated herein by reference in its entirety.

BACKGROUND OF INVENTION

1. Field of Invention

The present invention pertains to power generation systems employing gas generators that utilize natural gas as a hydrocarbon fuel source for producing combustion reactions.

2. Related Art

Cogeneration involves using a single fuel source to simultaneously produce, in the same facility, thermal energy, usually in the form of steam, and electric energy. Many cogeneration processes use an integrated, high-efficiency combined cycle to increase efficiency. Typically, a combined cycle is a steam turbine (i.e., Rankine-cycle) thermodynamically coupled with a gas turbine (i.e., Brayton-cycle). Steam and gas turbine combined cycle systems are often used where natural gas is the fuel source because natural gas tends to have a lower concentration of impurities than other fuel sources that cause corrosion, fouling and rapid deterioration in the gas turbine parts, particularly gas turbine blade surfaces.

Gas generators are attractive power generation technologies. Certain types of gas generators are capable of operating substantially free of pollutants. Exemplary high-pressure power gas generators with near-zero emission products are described in U.S. Pat. Nos. 5,709,077, 5,970,702, 5,680,764, 5,715,673, 5,956,937, 6,170,264, 6,206,684, 6,247,316, 6,389,814, 6,523,349, 6,598,398, 6,622,470 and 6,637,183, and also in U.S. Patent Application Publication Nos. 2004/0065088, 2004/0003592, 2003/0131582 and 2002/0174659. The disclosures of these patent publications are incorporated herein by reference in their entireties.

For example, in some of the power generation systems described in the previously noted patent documents, a high pressure fuel and high pressure $O_2$ along with water are combined in a gas generator to form a combustion reaction and generate a high temperature gas. The combustion temperature is controlled by cooling water injected (e.g., via spraying) into a gas mixing chamber in the gas generator. The high pressure, high temperature steam/$CO_2$ mixture from the gas generator is passed through a series of turbines with inter-turbine reheaters between the turbines. The gas is condensed and water is optionally recycled to the gas generator.

While power generation systems such as those described above are highly effective in producing mechanical and/or electrical energy per the requirements of a particular application, there is always the desire to maximize efficiency and reduce energy costs during system operation where possible. In particular, it would be beneficial to recover and utilize at least some of the heat losses that are typically associated with system operation of the power generation systems.

SUMMARY OF THE INVENTION

It is an object of the present invention to provide a power generation system that recovers heat losses normally associated with system operation during the power generation process.

It is another object of the present invention to enhance system efficiency by utilizing recovered heat losses of the power generation system during the power generation process.

It is a further object of the invention to vaporize liquefied natural gas in an efficient manner prior to delivery of the natural gas, e.g., in a pipeline and/or for use in a gas generator of a power generation system.

The aforesaid objects are achieved individually and/or in combination, and it is not intended that the present invention be construed as requiring two or more of the objects to be combined unless expressly required by the claims attached hereto.

In accordance with the present invention, a power generation system comprises a gas generator configured to receive an oxygen stream and a gaseous hydrocarbon fuel stream at an inlet of the gas generator, and a turbine section disposed downstream from the gas generator to receive and expand a combustion product stream from the gas generator. A heat exchange section is provided to facilitate heat exchange between a liquefied natural gas (LNG) supply from a LNG supply source and at least one other stream flowing within the system such that at least a portion of the LNG stream is converted to the gaseous hydrocarbon fuel stream that is to be delivered to the gas generator and the at least one other stream is cooled to a selected temperature.

In another embodiment of the present invention, a method of combining a gas generator with a LNG supply source in a power generation system comprises supplying a LNG stream from the LNG supply source to the system, and supplying an oxygen stream and a gaseous hydrocarbon fuel stream to an inlet of the gas generator to produce a combustion product stream comprising steam and carbon dioxide. The combustion product stream is delivered to a turbine section disposed downstream from the gas generator and is expanded in the turbine section. In addition, heat exchange is facilitated between the LNG stream and at least one other stream flowing within the system, via a heat exchange section disposed between the LNG supply source and the gas generator, where at least a portion of the LNG stream is converted to the gaseous hydrocarbon fuel stream prior to delivery of the gaseous hydrocarbon fuel stream to the gas generator and the at least one other stream is cooled to a selected temperature.

The heat exchange section can be combined with an air separation unit (ASU) that is provided to receive and cool ambient air so as to produce the oxygen stream for the gas generator. In an exemplary embodiment, at least one LNG stream is delivered to the ASU to facilitate heat exchange between the LNG stream and the air stream so as to liquefy the air stream for production of the oxygen stream by the ASU. Alternatively, or in combination with providing heat exchange between the LNG stream and the air stream to the ASU, the LNG stream can be used to cool a combustion product stream from the gas generator to facilitate separation of water from carbon dioxide and/or cool carbon dioxide from the combustion product stream to a liquid state for use in other applications.

By exchanging heat between the LNG stream and one or more other fluid streams flowing within the system, heat losses normally occurring during system operation are conserved so as to reduce operational costs and enhance system efficiency.

The above and still further objects, features and advantages of the present invention will become apparent upon consideration of the following detailed description of specific embodiments thereof, particularly when taken in conjunction with the accompanying drawings wherein like reference numerals in the figures are utilized to designate like components.

DESCRIPTION OF PREFERRED EMBODIMENTS

Figure 1:
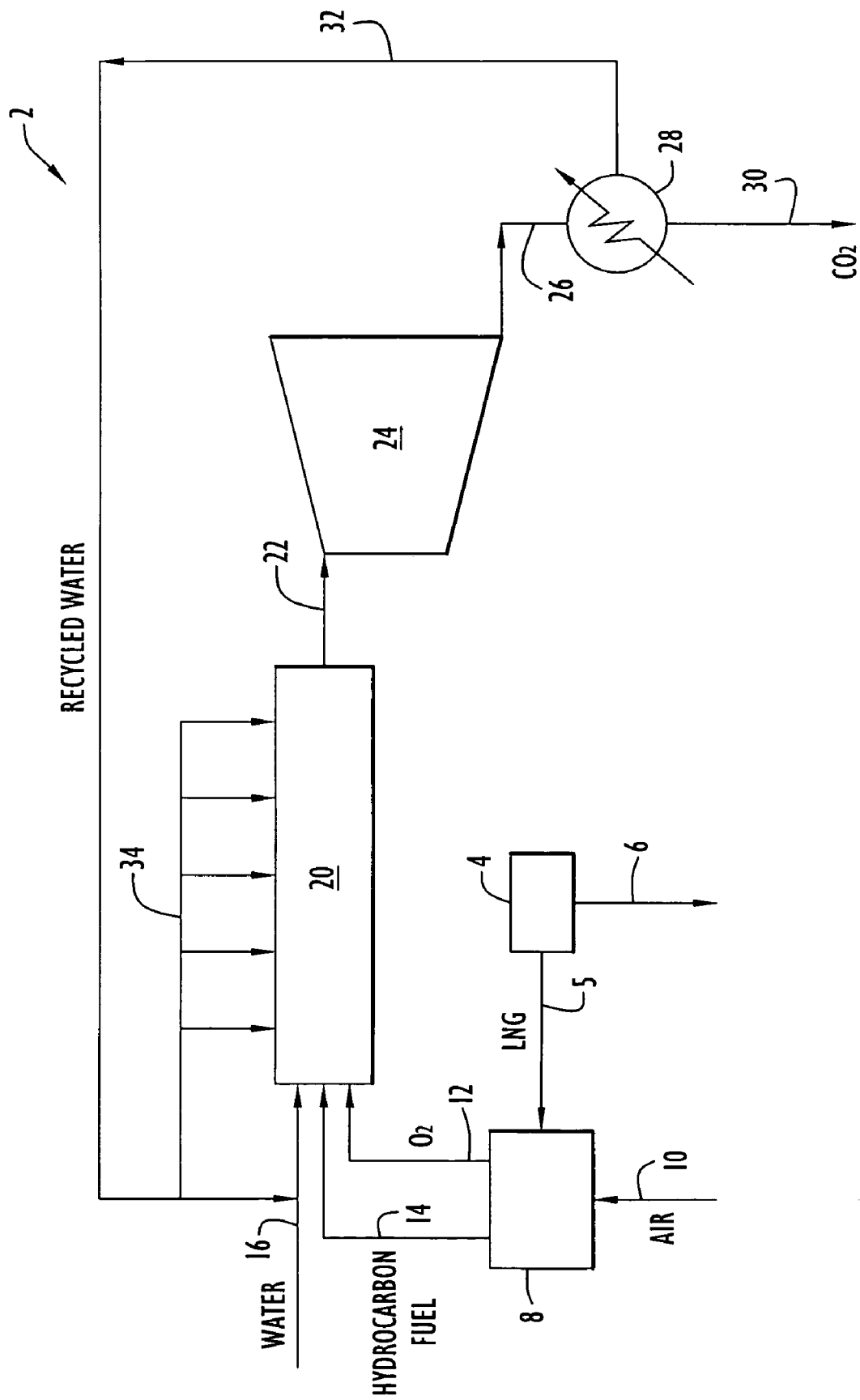
FIG. 1 is a diagram of an exemplary embodiment of a power generation system combined with a liquefied natural gas supply source in accordance with the present invention.

In accordance with the present invention, a power generation system is combined with a liquefied natural gas (LNG) supply, where the LNG is used as a cold sink to recover heat from the system during operation so as to enhance system efficiency and reduce overall energy requirements for system operation.

The terms "liquefied natural gas" or "LNG," as used herein, refer to a fluid in a liquid state that includes at least one hydrocarbon, preferably methane. An LNG stream typically includes methane ranging from about 80% to about 95% by volume, with the remaining components being, e.g., other hydrocarbons, $CO_2$, water, etc. The precise LNG composition for a particular application will vary based upon the LNG production and supply source (including any processing associated with the LNG). Liquefied natural gas exists at a liquid state at temperatures ranging from about −120° C. (−184° F.) to about −170° C. (−274° F.) and pressures ranging from about 101 kPa (14.7 psi) to about 1000 kPa (150 psi), where the precise temperature and pressure conditions are based upon the actual LNG composition.

The power generation system includes a gas generator combined with a turbine section as well as other components, such as condensers, pumps, etc., that maintain the fluid streams at desired conditions during system operation. The power generation system can include any suitable configuration, such as any of the configurations described in the previously cited patent documents. In particular, the gas generator receives a supply of natural gas as a hydrocarbon fuel source and oxygen to facilitate a combustion reaction of the products. The oxygen is provided at a selected purity level (e.g., 80% or greater by volume) from any suitable supply source, such as an air separation unit (ASU). Water (e.g., de-ionized water) is also provided to the gas generator to control the temperature of the combustion reaction.

The turbine section includes one or more gas turbines, with optional gas reheaters disposed between two or more turbines, and is provided downstream from the gas generator to receive the combustion products (primarily $CO_2$ and steam). The energy released from the expanding gases is collected within the turbines in the form of mechanical and/or electrical energy. The expanded combustion products are then delivered from the turbine section at a reduced pressure to a condenser, where they are cooled to condense the steam to form water. Water is separated from gaseous $CO_2$ in the condenser. The water is then recycled back to the gas generator, while the gaseous $CO_2$ is further processed (e.g., converted to liquid $CO_2$) for use in other applications (e.g., for hydrocarbon recovery processes, such as coal bed methane recovery and/or other natural gas or oil recovery processes) and/or vented to the atmosphere.

The hydrocarbon fuel source provided in accordance with the invention is liquefied natural gas (LNG). As noted above, the composition of LNG includes methane and/or other hydrocarbons that serve as fuel for the combustion reaction in the gas generator. The low temperature of LNG (e.g., ranging from about −120° C. to about −170° C.) makes the LNG supply a highly effective cold sink for facilitating heat exchange with one or more other process streams of the system. In addition, the heat exchange between the LNG supply and other process streams in the system converts at least a portion of the LNG to a gaseous stream prior to delivery of the natural gas to the gas generator. Liquefied natural gas that is vaporized in the system can also be used for other applications (e.g., for delivery in a natural gas pipeline for use at other sites).

For example, the LNG supply can be combined with the inlet air stream within an ASU in the system to facilitate heat exchange between the streams. The inlet air to an ASU is typically provided at ambient or room temperature, and the air is cooled to subzero temperatures which results in liquefaction of the air. The liquefied air within the ASU is then separated into two or more purified product streams (e.g., $O_2$, $N_2$, etc.). The LNG supply is at a sufficiently low temperature to liquefy the ambient air stream so as to facilitate separation of oxygen from nitrogen and other components of the air stream within the ASU. Alternatively, or in addition to being used to cool at least a portion of the air for the ASU, the LNG supply can be utilized in a heat exchange process with one or more of the combustion products emerging from the turbine section so as to facilitate condensation of steam to water and separation of water from gaseous $CO_2$.

The amount of LNG that is vaporized within the ASU, and/or via heat exchange with any other fluid streams of the power generation system, can exceed the amount of natural gas required for system operation. In this situation, the excess natural gas that has been vaporized can be used for other applications (e.g., the excess natural gas can be delivered in a pipeline to other sites).

An exemplary embodiment of a power generation system in accordance with the invention is depicted in FIG. 1. In particular, system 2 includes an air separation unit (ASU) 8 that receives an air stream 10 from the ambient environment and separates the air into two or more product streams, including an $O_2$ stream 12 that is at a selected purity level rendering the oxygen suitable for use in the power generation system. The ASU operates in a conventional and well-known manner by cooling the incoming air stream to a liquid state, followed by separation of components of the air stream, including oxygen, into separate product streams.

A liquefied natural gas (LNG) supply source 4 (e.g., a storage tank or vessel) provides an LNG stream 5 at a selected temperature and pressure to the ASU 8 to facilitate a sufficient level of cooling of the air stream within the ASU to achieve the desired separation of oxygen and other components from the ASU. Optionally, the LNG supply source 4 also provides an LNG stream 6 to other sites for use in other applications. It is noted that any suitable number of pressurization units (e.g., pumps) and/or thermal treatment units (e.g., heaters, chillers, etc.) can be provided along the LNG and/or other fluid supply lines within the system to provide the LNG and natural gas at the desired temperatures and pressures to a particular location during system operation.

The heat exchange within ASU 8 between the LNG and air can occur in any suitable manner. For example, heat exchange can occur via direct contact of the two streams within the ASU. However, to ensure safety of the process, indirect heat exchange is preferable between the two streams and can be achieved, for example, utilizing a closed-loop cooling system including optional additional heat exchange mediums (e.g., water and/or other suitable fluids). The heat exchange within ASU 8 converts the LNG to a gaseous fluid, while the air stream in the ASU is separated into purified oxygen (e.g., at a purity level of 80% or greater by volume) and at least one other stream. The ASU includes outlets for a natural gas fluid stream 14 and at least one $O_2$ stream 12 emerging from the ASU. The system can be configured with suitable flows of air and LNG to the ASU such that the ASU generates an excess supply of oxygen and/or an excess supply of vaporized natural gas for use in other applications. In this configuration, the natural gas and/or $O_2$ output streams from the ASU can be branched to facilitate a supply of some of the fluids flowing in those streams to the gas generator, while the excess fluids are delivered to other applications.

Optionally, the ASU can also generate at least one other purified stream (e.g., a purified $N_2$ stream) for use in system operation and/or other applications. For example, a purified $N_2$ stream produced by the ASU in a liquid state can be used as a heat sink in a similar manner as the LNG supply source (e.g., to cool incoming air to the ASU and/or to cool combustion products from the gas generator to facilitate separation of water from $CO_2$) and/or transported from the system for use in other applications.

A gas generator 20 is disposed downstream from ASU 8 to receive natural gas fluid stream 14 and $O_2$ stream 12 at an inlet to the gas generator. A water stream 16 is also provided from a water supply source, such as a tank or vessel (not shown), to the inlet of the gas generator 20. The gas generator facilitates a combustion reaction upon the contact of the natural gas and $O_2$ streams within the generator, with the water stream being provided to control the combustion temperature to selected levels. The combustion product stream 22 emerging from an outlet of gas generator 20 includes primarily $CO_2$ and steam. The temperatures and pressures of the combustion products can be controlled based upon a number of factors including, without limitation, the amounts of $O_2$ and natural gas components as well as the amount of water provided to the gas generator, the numbers and types of reheaters that may be used, etc. The temperatures and pressures of the combustion products, as well as the compositions of steam and $CO_2$ within the combustion products, can be selected in any conventional or other suitable manner to conform with the specifications of the turbine section (e.g., depending upon the types and number of stages of the turbines).

A multi-stage turbine section 24, including any selected number of turbines and/or turbine stages, is provided downstream from the gas generator to receive combustion product stream 22 at an inlet to the turbine section. The combustion product gases are expanded within the turbine section to generate mechanical and/or electrical energy.

Disposed downstream from the turbine section is a condenser 28. Expanded gases emerging from the turbine section in stream 26 are cooled in condenser 28 via a suitable cooling medium (e.g., water) so as to condense steam to water and also separate the water from gaseous $CO_2$. The gaseous $CO_2$ can be delivered, via a supply line 30, to another area (not shown) for further processing and/or use in other applications.

A recycle line 32 is connected between an outlet of condenser 28 and an inlet to gas generator 20 (e.g., via a branch connection with water supply line 16 as shown in FIG. 1). The recycle line facilitates re-use of water within the gas generator. In addition, recycled water from line 32 can also be injected or sprayed at multiple inlet locations disposed along length of the gas generator (e.g., via a manifold section 34 with multiple branched lines to provide multiple water inlets to the gas generator as shown in FIG. 1). Preferably, the recycle water is added to control the temperature of gases within gas generator so as not to exceed a threshold or maximum allowable temperature and to generate combustion reactions while not allowing water droplets to enter the turbine section (so as to prevent potential damage to the turbine blades). Further, both the inlet water and recycle water streams are preferably de-ionized water streams.

In operation, air at an ambient temperature is drawn into ASU 10 via inlet stream 10 and is cooled to a suitable temperature by LNG stream 5, which is also provided at an inlet to the ASU from LNG supply source 4. The ASU processes the cooled air to form a purified $O_2$ stream 12 at its outlet. In addition, as a result of the heat exchange occurring within the ASU, the LNG is warmed to a gas and emerges from the ASU as a natural gas stream 14. Streams 12 and 14 are delivered to an inlet of gas generator 20, along with a water stream 16 (and recycle water stream 32), to facilitate a combustion reaction within the gas generator that produces primarily $CO_2$ and steam at elevated temperatures and pressures.

The combustion products emerging from gas generator 20 in stream 22 are delivered to turbine section 24 for expansion, where energy released by the expanding gases is captured by the turbine section. The combustion products are then delivered from the turbine section at a reduced pressure, via stream 26, to condenser 28. The condenser cools the product stream to condense steam to form water and then separate water from gaseous $CO_2$ so that the water can be re-used by the system and the $CO_2$ further processed and/or used in other applications as described above.

Thus, the heat exchange between the LNG and air streams in the ASU of the system described above reduces energy requirements during system operation and enhances overall system efficiency by taking advantage of the low temperature LNG supply to the system. As noted above, the LNG supply can also serve as a cold sink to provide heat exchange with one or more other process streams at one or more other sections of the system. For example, the LNG supply can be used to cool the gaseous $CO_2$ stream from the combustion products, and the cooled $CO_2$ can further be pressurized to any suitable pressure, so as to form a $CO_2$ product in a gaseous, liquid and/or supercritical state, depending upon the applications in which the processed $CO_2$ is to be used.

Figure 2:
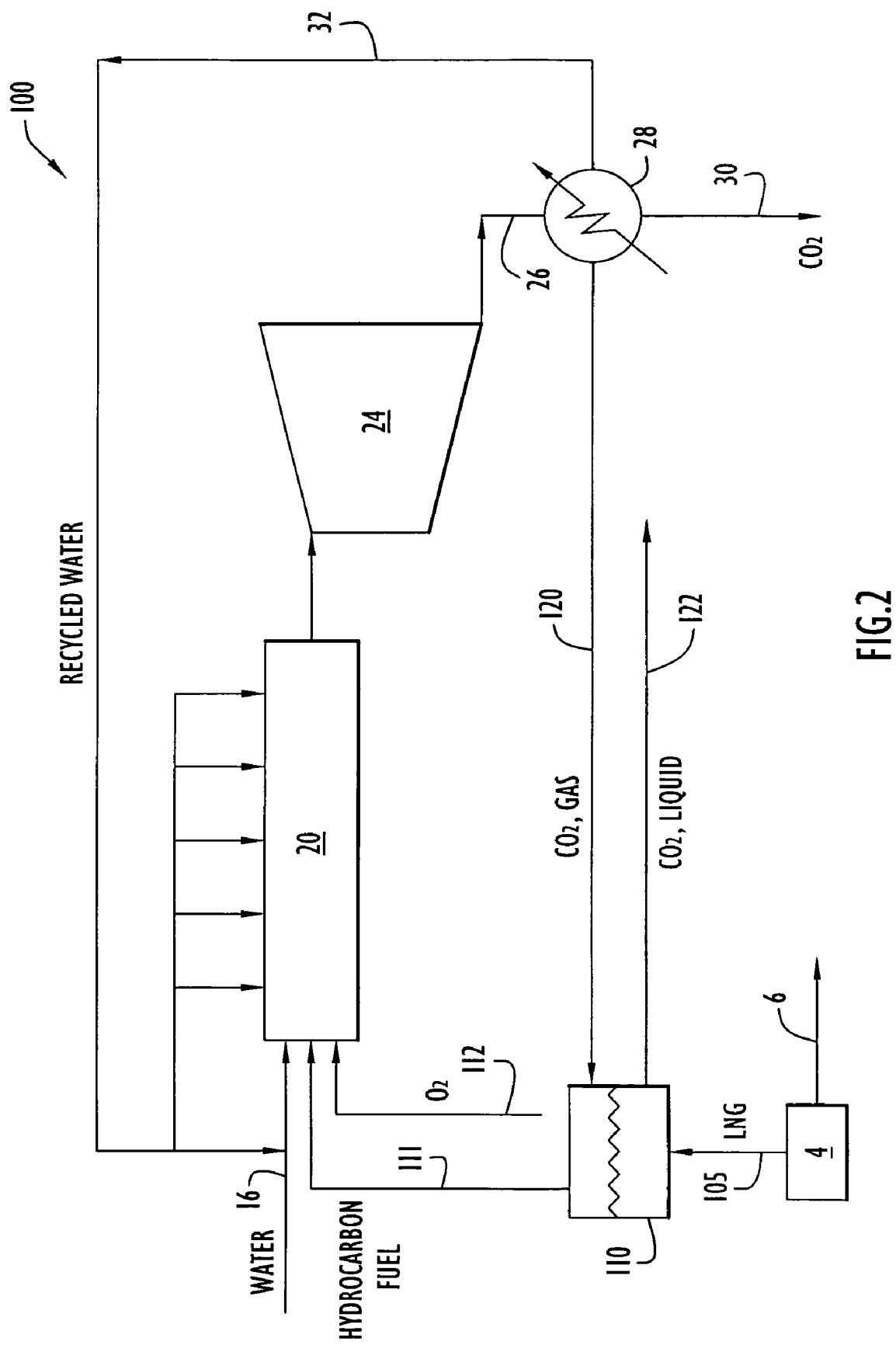
FIG. 2 is a diagram of another exemplary embodiment of a power generation system combined with a liquefied natural gas supply source in accordance with the present invention.

Referring to FIG. 2, system 100 is similar to the system described above and depicted in FIG. 1, with the exception that the LNG supply source 4 provides a LNG stream 105 to a heat exchanger 110 prior to delivery of the vaporized natural gas stream 111 to gas generator 20. In particular, condenser 28, which cools the expanded combustion product stream 26 provided from turbine section 24 to condense steam to form water and then separate the water from gaseous $CO_2$, delivers a gaseous $CO_2$ stream 120 to heat exchanger 110. The heat exchanger can be of any suitable type that facilitates direct and/or indirect heat exchange between the LNG and gaseous $CO_2$ streams entering the heat exchanger. As a result of the heat exchange, at least a portion of the LNG is vaporized in the heat exchanger and emerges as natural gas in stream 111, while the gaseous $CO_2$ is cooled to a liquid state at a suitable temperature and emerges from the condenser as stream 122. The natural gas stream 111 is directed, along with a purified $O_2$ stream 112 and water stream 16, to the inlet of gas generator 20 to facilitate the combustion reaction in the generator as described above. Oxygen stream 112 can be provided from an ASU (not shown) in a similar manner as described above, where air is cooled in the ASU and processed to form $O_2$ at a selected purity level for use by the gas generator. In addition, a portion of LNG can be provided from LNG supply source 4 to the ASU in a similar manner as described above and shown in FIG. 1 to facilitate operation of the ASU and sufficient cooling of the air.

Figure 3:
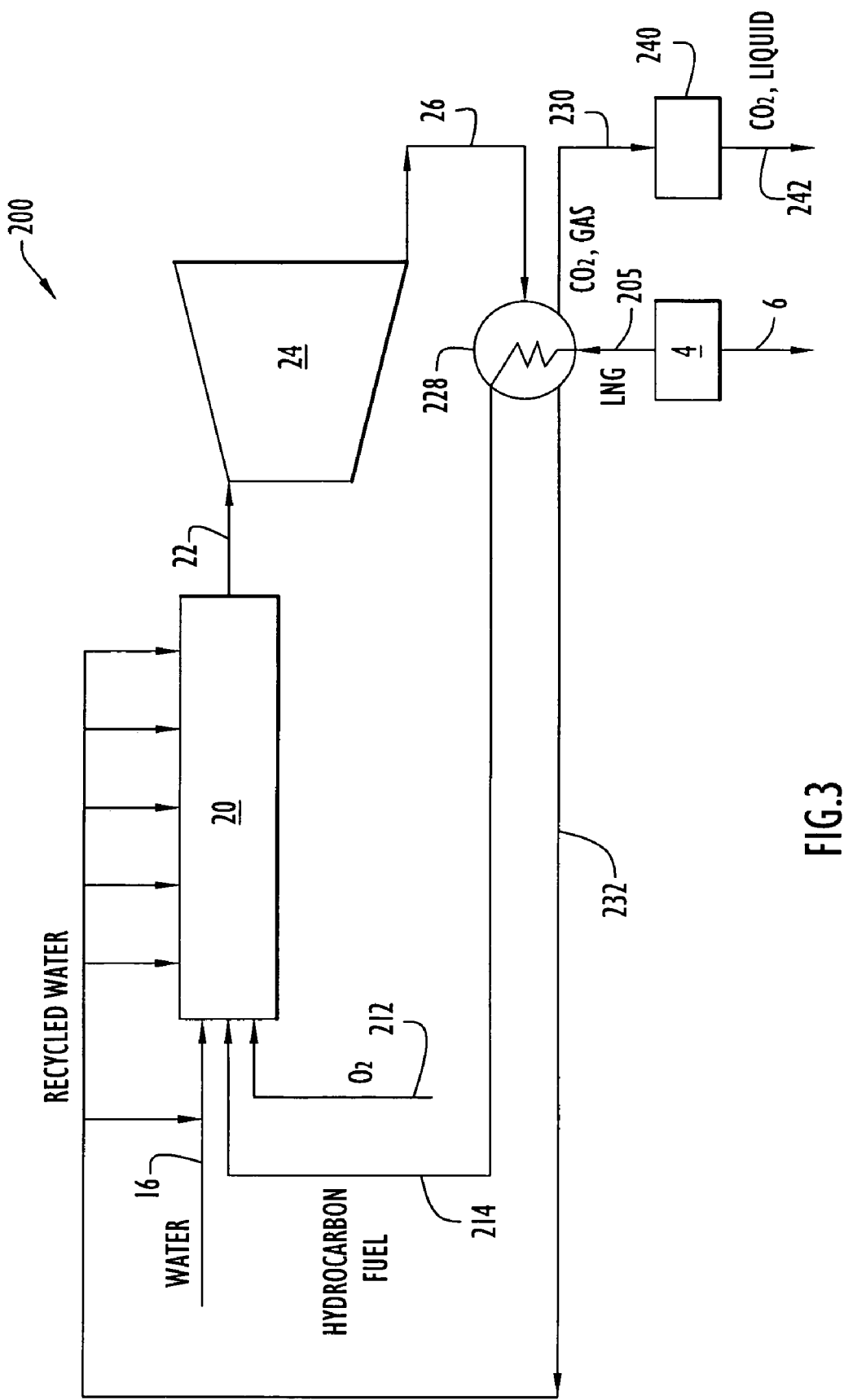
FIG. 3 is a diagram of a further exemplary embodiment of a power generation system combined with a liquefied natural gas supply source in accordance with the present invention.

Another embodiment of a power generation system combined with LNG supply is depicted in FIG. 3. In this embodiment, system 200 is similar to the embodiment described above and depicted in FIG. 1, with the exception that the condenser disposed downstream from the turbine section utilizes LNG as the cooling medium to cool the combustion gases. In particular, LNG supply source 4 provides a supply of LNG in stream 205 to condenser 228 to facilitate direct and/or indirect heat exchange with the combustion gas stream 26 delivered to the condenser from turbine section 24. As a result of the heat exchange, the LNG stream is vaporized and emerges from condenser 228 as a natural gas stream 214 that is supplied, along with $O_2$ stream 212 and water stream 16 (as well as recycle water stream 232) to the inlet of gas generator 20. As in the previous examples, system 200 may further include an ASU (not shown) to supply the $O_2$ stream, and a portion of LNG may also be directed from LNG supply source 4 to the ASU to sufficiently cool inlet air for achieved the desired separation of $O_2$ from the air at a selected purity level as well as any other desired components.

The combustion product stream 26 is cooled in condenser 228, steam is condensed to water, and at least a portion of the water is separated from gaseous $CO_2$, where water is recycled in stream 232 back to the inlet of the gas generator in a similar manner as described above and depicted in FIG. 1. The gaseous $CO_2$ stream is directed from condenser 228 in stream 230 and is then further processed, e.g., via pressurization by a pressurization unit 240 (e.g., a pump), to form a liquid $CO_2$ product stream 242 for use in other applications. Alternatively, or in addition to pressurization, the $CO_2$ stream emerging from the condenser can be directed to a suitable heat exchanger for heat exchange with a suitable portion of LNG provided from LNG supply source 4 (not shown) to facilitate the formation of gaseous, liquid and/or supercritical $CO_2$ products at any one or more selected pressures and temperatures.

The systems described above are just some of the examples of implementing a LNG supply source with a gas generator in accordance with the present invention. Other systems in which the LNG supply source is combined with one or more streams to facilitate heat exchange between the streams are also possible. In particular, any combination of heat exchange between one or more LNG streams from the LNG supply source and two or more other fluid streams (e.g., any combination of the systems described above and depicted in FIGS. 1-3) can occur within a single system to effectively capture waste heat from the system and vaporize a selected amount of LNG for use by the system and/or in other applications.

For example, a system of the invention can include an LNG supply source with at least two LNG streams for use in the system, where a first LNG stream is provided from the LNG supply source to the ASU to facilitate the formation of vaporized natural gas and oxygen streams for delivery to the gas generator (e.g., as depicted in FIG. 1), and a second LNG stream is utilized to cool the expanded combustion product stream from the gas generator and turbine section for separation of water from carbon dioxide (e.g., as depicted in FIG. 3). In this example, the vaporized natural gas formed from the cooling of the combustion product stream can be directed to the gas generator and/or used in other applications. The system can also include a third LNG stream to cool the separated carbon dioxide stream to a liquid state (e.g., as depicted in FIG. 2) and also to form an additional vaporized natural gas stream for use by the system and/or in other applications.

Thus, the LNG supply source can be used as a cold sink to provide effective heat exchange with any one or more fluid streams within the system, where the fluids are cooled to suitable temperatures to yield products for use by the system and/or in other applications and where the LNG is vaporized to natural gas for use by the system and/or in other applications. As noted above, the LNG can be used to provide cooling to the inlet air for the ASU, to recover waste heat from the combined steam and $CO_2$ combustion product stream and to convert the steam to water and the carbon dioxide to one or more fluid states for use in other applications.

In addition, the waste heat from the inlet air to the ASU and/or the combustion products is used to vaporize the LNG prior to delivery of natural gas to the gas generator, thus avoiding the requirement for having to heat the LNG to form natural gas prior to combustion in the gas generator. Preferably, gas generation systems are provided in accordance with present invention in which the total waste heat recovered from fluid streams of the system is sufficient to fully vaporize the LNG supply source to natural gas prior to delivery to the gas generator.

Further, the heat exchange between the LNG stream and the air stream in the ASU can generate excess oxygen (i.e., more oxygen than is needed for system operation) that can be used in other applications. In addition, the ASU can generate other product streams (e.g., liquid nitrogen) that can be used within the system (e.g., as a cold sink for heat exchange with other fluid streams of the system) and/or in other applications.

Thus, the combination of LNG with one or more fluid streams in the gas power generation system results in higher processing efficiencies and lower capital costs and operating costs due to a reduction in required equipment and also the synergies associated with combining fluid streams of the system that are at different physical states (i.e., gaseous or liquid) in this manner.

Having described novel systems and methods for combining a gas power generation system including a gas generator with a liquefied natural gas supply, it is believed that other modifications, variations and changes will be suggested to those skilled in the art in view of the teachings set forth herein. It is therefore to be understood that all such variations, modifications and changes are believed to fall within the scope of the present invention as defined by the appended claims.

The invention claimed is:

1. A method of combining a gas generator with a liquefied natural gas (LNG) supply source in a power generation system, the method comprising:
supplying a LNG stream from the LNG supply source to the system;
supplying an oxygen stream and a gaseous hydrocarbon fuel stream to an inlet of the gas generator to produce a combustion product stream comprising primarily steam and carbon dioxide;
delivering the combustion product stream to a turbine section disposed downstream from the gas generator;

expanding the combustion product stream in the turbine section; and exchanging heat between the LNG stream and at least one other stream flowing within the system, via a heat exchange section disposed between the LNG supply source and the gas generator, wherein at least a portion of the LNG stream is converted to the gaseous hydrocarbon fuel stream prior to delivery of the gaseous hydrocarbon fuel stream to the gas generator and the at least one other stream is cooled to a selected temperature, wherein:

the exchanging heat between the LNG stream and at least one other stream flowing within the system comprises:

providing the expanded combustion product stream flowing from the turbine section and the LNG stream flowing from the LNG supply source to a heat exchanger; and facilitating heat exchange within the heat exchanger between the LNG stream and the combustion product stream; and the facilitating heat exchange within the heat exchanger between the LNG stream and the combustion product stream condenses steam from the combustion product stream to form water.

2. The method of 1, further comprising:

supplying the water formed in the heat exchanger to the inlet of the gas generator.

* * * * *